United States Patent [19]
McMahon et al.

[11] 3,748,372
[45] July 24, 1973

[54] ELECTRICAL CABLE WITH POLYMER-OIL INSULATION

[75] Inventors: Eugene Joseph McMahon; John Oliver Punderson, both of Wilmington; William Paul Vitcusky, Newark, all of Del.

[73] Assignee: E. I. du Pont de Nemours and Company, Wilmington, Del.

[22] Filed: Oct. 9, 1970

[21] Appl. No.: 79,588

[52] U.S. Cl..... 174/102 R, 117/138.8 UF, 161/189, 174/25 C, 174/102 C, 174/108 FC, 174/120 SR, 252/64
[51] Int. Cl. .......................................... H01b 7/18
[58] Field of Search............... 174/25 R, 25 C, 25 P, 174/121 R, 121 CR, 110 FC, 120 R, 120 C, 120 SR; 317/258; 252/64; 161/189; 117/138, 8 UF, 138.8 E

[56] References Cited
UNITED STATES PATENTS

3,664,959 5/1972 Gaines.................................. 252/64
3,484,664 12/1969 Liddicoat........................ 174/25 R
3,378,419 4/1968 Eich............................ 174/120 R X
3,430,116 2/1969 Johnstone........................... 317/258
3,450,968 6/1969 Cox............................. 174/25 R X Primary Examiner—E. A. Goldberg
Attorney—Edwin Tocker

[57] ABSTRACT

The dissipation factor of oil-filled polymer tape insulation is reduced when the affinity of the oil and the polymer for one another is increased. For example, addition of a small amount of silicone oil to polybutene oil increases the affinity of the polybutene oil for the polymer and electrostatic treatment of the polymer surface increases the affinity of the polymer for the oil. These approaches can be used separately or in combination. The resultant insulation is useful as insulation between the current carrying conductors of electrical cable.

26 Claims, 15 Drawing Figures

PATENTED JUL 24 1973

FEP FILM—OIL INSULATION, TEMPERATURE EFFECT.

FIG. 3

TFE FILM—OIL INSULATION, TEMPERATURE EFFECT

INVENTORS
EUGENE JOSEPH MCMAHON
JOHN OLIVER PUNDERSON
WILLIAM PAUL VITCUSKY

BY  *Edwin Vocker*

ATTORNEY

FIG. 4

TFE FILM — OIL
INSULATION
TIME EFFECT

FIG. 5

FEP FILM — OIL
INSULATION
TIME EFFECT

FIG. 6

TFE FILM-OIL-
ADDITIVE INSULATION
(BY IMPREGNATION)

FIG. 6A

TFE FILM - OIL
ADDITIVE INSULATION
(BY DIPPING)

INVENTORS
EUGENE JOSEPH MCMAHON
JOHN OLIVER PUNDERSON
WILLIAM PAUL VITCUSKY

BY *Edwin Tocker*

ATTORNEY

FIG.7

ELECTROSTATICALLY TREATED FEP FILM OIL INSULATION

FIG.8

FEP FILM – SILICONE OIL INSULATION EFFECT OF ELECTROSTATIC DISCHARGE

INVENTORS
EUGENE JOSEPH MCMAHON
JOHN OLIVER PUNDERSON
WILLIAM PAUL VITCUSKY

BY Edwin Tocker

ATTORNEY

FIG. 9

ELECTROSTATICALLY TREATED FEP FILM-OIL-ADDITIVE INSULATION

FIG. 10

ETCHED TFE FILM-OIL-ADDITIVE INSULATION

FIG. 11

ETCHED FEP FILM-OIL-ADDITIVE INSULATION

FIG. 12

EFFECT OF ELECTROSTATIC TREATMENT AND OIL ADDITIVE ON POLYETHYLENE FILM-OIL INSULATION

FIG. 13

EFFECT OF ELECTROSTATIC TREATMENT ON POLYCARBONATE FILM-OIL INSULATION

FIG. 14

ELECTRICAL CABLE WITH POLYMER-OIL INSULATION

This invention relates to electrical insulation, and more particularly insulation systems comprised of multiple layers of polymer tape flooded with oil.

Historically, insulation for electrical cable has been made of tape of kraft paper helically wrapped in overlapping layers around an electrical conductor. The resultant layers of paper have then been impregnated under vacuum with oil to exclude air bubbles from the insulation which would lead to corona discharge resulting in premature failure of the cable (U. S. Pat. No. 3,016,481). Although the resulting insulation was free of corona discharge, the paper-oil insulation still suffered from the disadvantages of high dielectric loss at extra high voltages, i.e. 345 kv. and higher, and the danger of catastrophic failure resulting from the cellulosic paper splitting off water if overload of the cable happened to increase the insulation temperature to about 120°C. or above.

Attempts have been made to use polymer tape in place of kraft paper tape which has reduced the dielectric loss and eliminated the decomposition problem. The use of oil to flood the layers of polymer tape wrapping under vacuum has yielded insulation which is free of corona discharge. However, another problem has arisen, namely, that the polymer tape/oil insulation system has exhibited an increase in dissipation factor as the cable was used. Thus, the increased power handling capability expected for this type of insulation has not been attainable because of the increasing heat generated within the insulation during use of the cable. In a comprehensive study of polymer tape/oil insulation systems, an increase in dissipation factor of such systems with aging was observed (A. M. Stake and T. H. Meltzer, "Polymer Designed for Extra High Voltage Applications", No. IITRI-U8001-57, Edison Electric Institute, ITT Research Institute, Dec. 31, 1967).

The dissipation factor of an insulation system is basically a measure of the electrical energy lost in an insulation system calculated from the out-of-phase relationship of the voltage and current to which the insulation system is subjected. The dissipation factor (D) of the system can be measured quantitatively as the tangent of the loss angle (tan δ) or as the ratio of the parallel reactance ($X_p$) of the insulation system to its parallel resistance ($R_p$).

The present invention involves the discovery that the increase in dissipation factor with aging in polymer tape/oil oil insulation systems is a phenomenon associated with the interface between the polymer tape and the oil in the system, and more particularly can be attributed to the lack of affinity of the oil and polymer tape for one another. That the affinity relationship between the oil and the polymer tape was pertinent to the phenomenon of increasing dissipation factor was surprising in view of the absence of corona discharge in the polymer tape/oil insulation system which meant that the oil and tape were in sufficient intimate contact to exclude air pockets form the system.

The present discovery is implemented by modifying the oil-polymer tape interface to increase the affinity of the oil and polymer tape for one another relative to the natural (unmodified) affinity of the oil and polymer tape for one another. The term "affinity" as used herein means the magnitude of the adhesive forces between the polymer tape and oil relative to the cohesive forces in the oil. The greater the adhesive forces relative to the cohesive forces, the higher is the affinity of the oil and polymer tape for one another.

In one embodiment of the present invention, the affinity of the oil for the tape is increased by lowering the surface tension of the oil. In another embodiment, the affinity of the tape for the oil is increased by surface activating, i.e. increasing the surface energy, of the polymer tape. These embodiments can be used separately or in combination.

These and other embodiments of the present invention will be described in greater detail hereinafter with reference to the drawings in which.

The improved insulation system will be described hereinafter with reference to use in electrical cable for the transmission of power; however, the insulation system is just as capable of other electrical applications such as in capacitors.

Figures 1, 2:
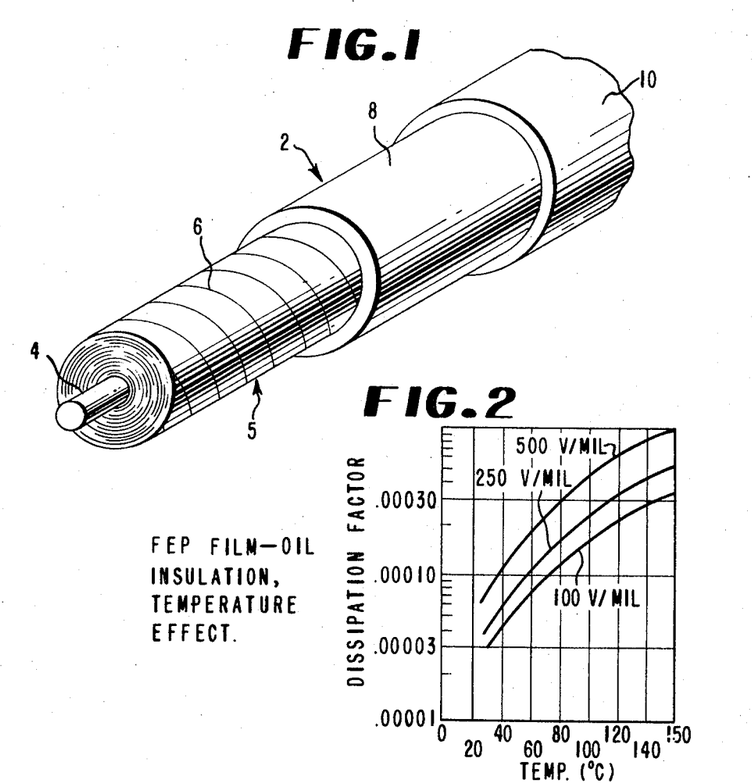
FIG. 1 is a perspective view of an electrical cable incorporating a polymer film/oil insulation system.
FIG. 2 is a graph showing the short term variation of dissipation factor vs. temperature for a tetrafluoroethylene-hexafluoropropylene copolymer (FEP) film/polybutene oil insulation system at the voltage stress levels indicated.

Referring to the drawings, FIG. 1 shows an electrical cable 2 which is typical of the kind used for transmitting alternating current, comprising an inner conductor 4 which is surrounded by primary insulation in the form of a tape/oil insulation system 5 which in turn is surrounded by an outer or shield conductor 8. The shield conductor may in turn be surrounded by an insulation jacket 10. In this embodiment of cable, the insulation system 5 concentrically positions the inner conductor within the outer conductor; the insulation system, however, can be used in other cable constructions to insulate the current-carrying conductors from one another.

The insulation system 5 comprises a plurality of overlapping layers, e.g. 100 layers, of polymer tape 6 which is flooded with oil (not visible). The tape 6 in each layer is in the form of helical wrapping about the inner conductor of the cable or a preceding layer of polymer tape. The helical wrapping can be in the form of open or closed helices depending on the flexibility desired for the cable. Open helices are most commonly used with a butt gap (gap between turns of the helix) of about 6 percent of the tape width. The helical turns of the tape of one layer are offset by one-half to one-third the width of the tape from the turns of the preceding layer. The number of layers will depend on such factors as the electric strength of the polymer from which the tape is made, the thickness of the tape, and the voltage stress desired for the insulation system.

The interstices between the layers of tape wrapping and within each layer, such as resulting from the butt gaps, is flooded with oil so as to displace all air bubbles from the insulation system, the presence of which would lead to corona. The tape can be flat-surfaced, have a surface pattern such as grooves, random embossments, or notches, or can include filamentary spacer material between layers to facilitate impregnation of the oil into and between the layers of tape wrapping to accomplish flooding. The polymer tape itself is oil impermeable so that this kind of impregnation is required in order to displace all air. Generally, the flooding with oil is accomplished by drawing a vacuum on the tape wrapping followed by adding the oil which enters the tape wrapping upon the release of the vacuum, obtaining the impregnation within and between the layers of the tape wrapping. The tape 6 is typically 2 to 10 mils thick but can be thinner or thicker as desired. Examples of polymer tape having various surface patterns are disclosed in U. S. Pat. Nos. 3,077,510 to Olds, 3,263,020 to Therenon, 3,223,773 to Priaroggia, 3,105,872 to Thompson et al., and 3,430,116 to Johnstone.

To further describe the components of the cable 2 in greater detail, the inner conductor 4 can be stranded or of solid cross section of any electrically conductive material such as copper, aluminum or sodium. The outer conductor 8 can be of solid or tape-wrapped construction of any conductive material such as copper, aluminum or lead. The conductors 4 and 8 can include layers of semi-conductive material such as graphite-filled polymer for evening out the electrical field adjacent to the insulation.

The polymer from which the tape 6 is made can be any polymer which has the electrical, chemical, and physical properties desired for a particular application. Thus, for example the polymer should have sufficient mechanical strength to withstand fabrication into an insulation system and its use. The polymer should also have sufficient thermal stability and high melting point to withstand the temperature of the application. As for electrical properties, the polymer is a dielectric with the degree of electrical non-conductivity depending on the voltage stress to be withstood.

With these criteria for selection of polymer, one example of polymer from which the tape component of the improved insulation systems of the present invention can be made is fluorocarbon polymer wherein the polymer chain consists essentially of carbon atoms or ether groups and in which the ratio of fluorine atoms on the chain to carbon atoms in the chain is at least an average of 1:1 and usually at least an average of 1.5:1. Examples of fluorocarbon polymers include the chlorotrifluoroethylene and tetrafluoroethylene polymers such as polychlorotrifluoroethylene, polytetrafluoroethylene and the copolymers of tetrafluoroethylene (tetrafluoroethylene copolymer) with less than 35 percent by weight based on total polymer weight of one or more copolymerizable monomers such as ethylene, ethylene and hexafluoroacetone as disclosed in U. S. Pat. No. 3,342,777, ethylene and other vinyl monomers as disclosed in German Patent Publication No. 1,957,963, hexafluoropropylene as disclosed in U. S. Pat. Nos. 3,085,083 and 2,946,763, higher perfluoroalkanes such as those containing from 4 to 10 carbon atoms, perfluoro(alkyl vinyl ethers) such as perfluoro(ethyl- or propyl vinyl ether) disclosed in U. S. Pat. No. 3,123,123, perfluoro-(2-methylene-4-methyl-1,3-dioxolane) as disclosed in U. S. Pat. No. 3,308,107, and the highly fluorinated monomers in which a single hydrogen is present which does not change the fluorocarbon character of the copolymer, such monomers being for example 2-hydroperfluoroalkene containing 1 to 3 carbon atoms such as 2-hydropentafluoropropene, the omega-hydroperfluoroalkenes containing from 3 to 10 carbon atoms, and the omega-hydroperfluoro(alkyl vinyl ethers) in which the alkyl group contains from 1 to 5 carbon atoms.

Additional examples of polymer from which tape can be made include the polyolefins such as polyethylene, polypropylene, and poly-4-methylpentene; polysulfones such as those consisting essentially of the recurring unit polyphenylene oxides, such as those consisting essentially of the recurring unit and polycarbonates such as those consisting essentially of the recurring unit When the insulation system is used as the primary insulation in electrical cable, the polymer from which the tape is made preferably has a dielectric constant which is no greater than 4.0 and a dissipation factor of no greater than 0.002. The dielectric constant values disclosed herein are measured at 20°C. unless otherwise specified, and the dissipation factor values disclosed herein are measured at 100°C. and a voltage stess of 100 volts/mil unless otherwise specified. The more preferred dielectric constant and dissipation factor for the polymer are no greater than 3.0 and 0.001, respectively. For other electrical applications, such as in capacitors, the polymer can have higher dielectric constant values to promote electrical storage capacity.

The oil component of the insulation system is any oil which has the electrical, thermal, and physical properties desired for a particular electrical application. For example, the oil is a dielectric or essentially non-conductive substance and should have a boiling point which is sufficiently high as not to boil during vacuum flooding or subsequent use of the insulation system. For cable application especially, a boiling point of at least 100°C., and preferably at least 150°C., at 1 mm. Hg vacuum is desired. The oil should also be inert to the conductors and to the tape of the insulation system so as not to chemically attack conductors or tape and should be sufficiently flowable to be able to impregnate between and within each layer of tape wrapping in the insulation system especially under the aforementioned conditions of temperature and vacuum. Broadly stated, the oil component is any dielectric non-aqueous liquid which is selected generally in accordance with the aforementioned criteria.

Examples of oil include the silicone oils having for example a backbone of recurring units of the formula wherein the free valences are attached to hydrocarbon groups such as alkyl groups having from 1 to 5 carbon atoms, such as poly(isobutylene siloxane), poly(phenylsiloxane), poly(ethylsiloxane), poly(methylphenylsiloxane) available as Dow Corning 550 fluid (DC-550), and poly(methylsiloxane) available as Dow Corning 200 fluid (DC-200). Additional examples of oils include the alkyl benzenes such as dodecyl benzene, the paraffin oils such as mineral oil, fluorinated compounds such as the fluorinated amines such as $(C_3F_7)_3N$, the cyclic ethers such as $C_8F_{16}O$ (FC-75) and perfluorinated kerosene, and the synthetic hydrocarbon oils such as polybutene and polypropylene oils. Further description of these oils and their properties is disclosed in N. Pikel, "Four Synthetic Liquid Insulations-Properties and Potentials", Insulation, pages 63–69 (May, 1968). Examples of oils which are especially useful in insulation systems used in capacitors are the chlorinated aromatic compounds such as the chlorinated biphenyls, chlorinated terphenyls and blends thereof, available as the Arochlors. Typically these compounds will be composed of 50 to 80 percent by weight of chlorine.

Preferably, the oil has a dielectric constant of no greater than 3.0 and a dissipation factor of no greater than 0.1 and more preferably no greater than 0.03.

Combinations of the foregoing described polymer tapes and oils will have varying degrees of affinity for one another depending on the particular combination of oil and polymer tape selected. This affinity can be described as the natural affinity of the polymer tape and oil for one another. According to the present invention, the tape and/or the oil is modified to increase their affinity for one another. Any method and means for accomplishing this result can be used provided the dielectric character of the resultant insulation system is not adversely affected to any significant degree.

One modification to the oil is to add an agent to the oil which reduces the surface tension of the oil. Any agent which has this effect on the oil can be used. Generally, to accomplish this result, the agent will have to be soluble, partially soluble, or emulsifiable with the oil. It has been found that the same silicone oil that is useful as the oil component of the insulation system acts as a surface tension lowering agent when added in a small amount of synthetic hydrocarbon oil such as polybutene oil. Thus, it becomes apparent that the selection of surface tension lowering agent will depend on which oil is selected for the oil component of the insulation system. Additional surface tension lowering agents include the hydrofluorocarbon compounds such as 1-perfluorodecyl dodecane, compounds (and polymers) of the formula wherein $n$ is an integer of from 6 to 12, and fluoroalkyl or hydrocarbon esters of the compound $F(CF_2)_nCH_2CH_2OH$, wherein $n$ is an integer of 6, 8, 10, or 12. Still further surface tension lowering agents include the monomeric organosilanes such as the amino, vinyl, epoxy, or vinyl functional organo silanes such as disclosed in U. S. Pat. Nos. 3,012,915, 3,252,825, 3,252,278, 2,931,739, 3,318,757, 2,920,095 and 3,231,540, and British Pat. No. 1,069,752. Examples of these silanes are the omega-aminoalkyltrialkoxy silanes such as gamma-amino-propyltriethoxy silane, meta - and para-aminophenyltriethoxy silane, and N(n-propyl trimethoxysilyl) ethylene diamine.

Still further examples of surface tension lowering agents are the reaction products of ethylene oxide with propylene oxide, amines, saturated and unsaturated alcohols or acids, or alkyl phenols, with the resultant compound being called an ethoxylate thereof. These compounds can be illustrated by the formulae $R[O(C_2H_4O)_nH]_x$ and $R[O(C_2H_4O)_a(C_3H_6O)_bH]_x$, wherein R is a saturated aliphatic hydrocarbon group generally containing from 8 to 24 carbon atoms, $n$ is an integer of 2 to 50, $x$ is an integer of 1, 2, or 3, $b$ is an integer of 0 to 30, and a is an integer of at least 2, $a + b$ being equal to $n$;

$R'C_6H_4O(C_2H_4O)_nH$ and $R'C_6H_4O(C_2H_4O)_a(C_3H_6O)_bH$ wherein $n$, $a$, and $b$ have the above meanings and R' is a monovalent saturated aliphatic hydrocarbon group containing from 4 to 20 carbon atoms. In all cases, the $—C_2H_4O—$ and $—C_3H_6O—$ units can be interspersed with one another or can form blocks of such units. Additional compounds include those represented by the formula wherein $n$ has the above meaning, Z is 1 or 2, $R^2$ is an alkyl group containing 1 to 8 carbon atoms, and R' is non-existent when $z$ is 2 and an alkyl group containing 1 to 8 carbon atoms when $z$ is 1, $R' + R^2$ providing at least 6 carbon atoms to the compound; the polyalkylene oxide block polymers of the formulae $$HO(C_2H_4O)_e(C_3H_6O)_f(C_2H_4O)_gH$$

wherein $f$ is an integer of from 15 to 65 and $e$ and $g$ are integers sufficiently high that $e + g$ total 20 to 90 percent of the total weight of the polymer.

Generally, the amount of surface tension lowering agent used will be from 0.01 to 10 percent, but in most cases from 0.1 to 2 percent of the agent will suffice. The concentrations of agent in oil disclosed herein is volume percent based on the volume of the oil to which the agent is added. The agent can be premixed with the oil or the tape can be coated with the agent prior to wrapping, and during subsequent flooding by the oil, the agent becomes mixed therewith.

The tape can be modified, i.e. surface activated, to increase its affinity for the oil. One method for surface activating the polymer tape is to chemically etch the surface (both surfaces) of the tape such as according to the procedure disclosed in U. S. Pats. Nos. 2,789,063 to Purvis and Beck and 2,809,130 to Rappaport, the sodium etch being the preferred chemical etch. The chemical etch, briefly, is conducted by contacting the surface of the tape with a solution of an alkali metal in an compound such as liquid ammonia or a solution of an alkali metal polyaryl hydrocarbon such as sodium naphthalene in dimethyl glycol ether at a temperature at which reaction between the alkali metal and tape composition occurs and for a time which confines the etch to the surface of the tape only. Generally, the tape surface is sufficiently etched after only a few seconds of contact with the etching solution.

Another method for surface activating the polymer tape is to subject its surface to electrostatic discharge which can be carried out according to the procedure described in U. S. Pat. No. 3,296,011 to McBride and Wolinski under conditions at which corona occurs during the discharge and the tape surfaces are exposed to this corona. The procedure can be briefly described as passing the tape betwen electrodes of opposite polarity spaced about 0.015 to 0.25 inches apart, applying an alternating current at a voltage of 10,000 to 30,000 volts to the high voltage electrode at a frequency of 300,000 to 500,000 cycles/sec. in the presence of air or inert atmosphere or a mixture of an inert gas and a volatile organic compound such as glycidyl methacrylate. The time of exposure of the tape to the electrostatic discharge will depend on the conditions used and polymer from which the tape is made. Typically, exposure times of 1 to 120 seconds will suffice.

Another method for surface activation of the polymer tape that can be used is the CASING (crosslinking by activated species of inert gases) treatment of the tape by the procedure disclosed in H. Schonhorn, F. Ryan, and R. Hansen, "Surface Treatment of Polypropylene for Adhesive Bonding", J. Adhesion 2, pages 93–99 (April, 1970). This treatment involves exposing the polymer tape to radio-frequency, activated inert gases, such as helium or argon, or activated oxygen or nitrous oxide when the tape is composed of polypropylene, which results in surface activating the polymer tape.

Still another method for surface activating the polymer tape involves the surface heat treatment disclosed in K. Hara and H. Schonhorn, "Effect on Wettability of FEP Teflon Surface Morphology", J. Adhesion 2, pages 100–105 (April, 1970) wherein the polymer is contacted with a heated nucleating surface such as gold film at 600°F., with the polymer tape and film being forced together at a pressure of 330 psi.

The foregoing described surface treatments are applied to the polymer tape prior to using the tape to form the insulation system. The modified oil and/or tape can be formed into an improved insulation system in a cable or other electrical device in the same way as polymer tape/oil insulation systems have been formed heretofore.

The resultant cable can be used as high voltage cable and is especially useful wherein the heretofore available cables are not technically or economically attractive, in the extra high voltage range beginning at the transmission of 345 kv and extending in the range of 500 kv applications and higher such as in 750 kv and 1100 kv applications. The resultant cable can also be used at lower operating voltages such as the range of 130 kv up to 345 kv.

The improvement in electrical performance obtained according to the present invention has been demonstrated using a test cell simulating the operating conditions of an electrical cable. The test cell consisted of a high voltage electrode and a measuring electrode, surrounded by a guard ring, within a cell cage. The cell cage was electrically connected to the guard ring. A shroud of thermally stable insulating material was used to hold down the test sample in contact with the guard ring beyond the area of the electrode. The shroud also served to grade the field at the edge of the high-voltage electrode, thus helping to avoid corona. A knob connected with an insulated shaft to the shroud and thus to the upper (high voltage) electrode was used to clamp the electrodes at a pressure determined by a slip-ratchet device mounted within the knob. A micrometer was used to measure the position of the upper electrode relative to the lower electrode.

The test sample consisted of 5 films (short lengths of tape) approximately 5 mils thick and 4 ¼ inches square of the polymer being tested. Three of the films were solid films and two had ⅛ inch diameter holes on ½ inch centers over their surface area to simulate the effect of butt gaps in a wrapping cable. The films with the holes were sandwiched between the solid films. The remaining component of the test sample was the oil component which was present and flooding the stack of films to displace all air bubbles therefrom.

The test procedure involved placing the stack of films (no oil) into the test cell between the high-voltage and guarded measuring electrodes. The electrodes were held apart with a support device provided within the cell. At this point, there was no mechanical pressure on the films. The test cell was then placed in a test chamber and a vacuum of 20 microns Hg was drawn on the chamber. Oil heated to 120°C. was then slowly dropped into the test chamber while under vacuum and held at 120°C. thus degassing the oil and flooding the films which was facilitated by the lack of mechanical pressure on the films. After the test chamber had been filled to a level completely submersing the test cell, the vacuum was released by filling with air, the chamber opened, the test cell clamped, applying 5 to 15 lbs/sq. inch pressure on the stack films. The system was again closed and held under the same vacuum for an additional 16 hours at 120°C. When vacuum flooding was complete, the test chamber was opened, its cover removed and the test chamber still containing the test cell was used for aging the test sample. The aging temperature, in most cases 100°C., was maintained to ± 1°C. for the entire duration of the test by a heating mantle about the test chamber and 12,500 volts was constantly applied to the upper eectrode of the test cell to provide the aging voltage. The oil initially added to the test chamber acted both as the oil component of the test sample and the heating medium for applying heat to the test sample. The 12,500 volts (A-C) applied between the upper electrode and ground electrode of the test cell amounted to a voltage stress of 500 volts/mil through the test sample. While aging, the measuring electrode was grounded. Periodically during the aging test, the aging voltage was disconnected from the test cell, and using a 60 Hertz Schering bridge, test voltages corresponding to voltage stresses of 40,250 and 500 volts/mil across the test sample were applied between the electrodes. These different stresses were tested to simulate the variation in stress through the cross section of tape/oil insulation in a cable. Balancing the Schering bridge gave a direct reading of tan δ or the dissipation factor (D).

The results shown in FIGS. 2 – 13 were obtained using the foregoing described test procedure for the time period indicated.

Figure 3:
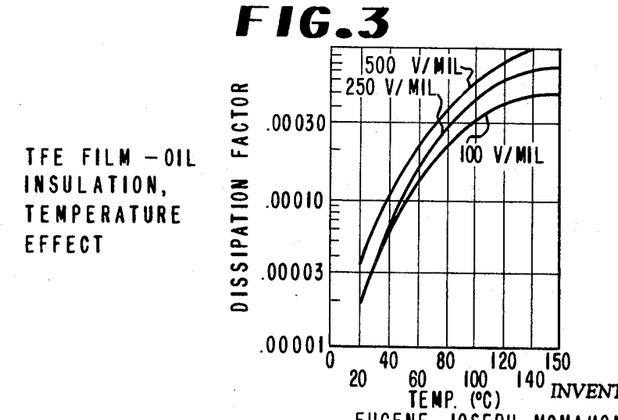
FIG. 3 is a graph showing the short term variation of dissipation factor vs. temperature of a polytetrafluoroethylene (TFE) film/polybutene oil insulation system at the voltage stress levels indicated.

FIGS. 2 and 3 show the relatively low dissipation factors of test samples of tetrafluoroethylene-hexafluoropropylene copolymers (FEP) and polytetrafluoroethylene (TFE), respectively, after about 6 hours of thermal aging at 100°C. at the voltage stress indicated. Thus, the dissipation factor for the copolymer was 0.0005 and for the homopolymer 0.0006 at 500 volts/mil stress for each. The oil component of the test sample was clay purified polybutene oil available as "Amoco 15H".

Figure 4:
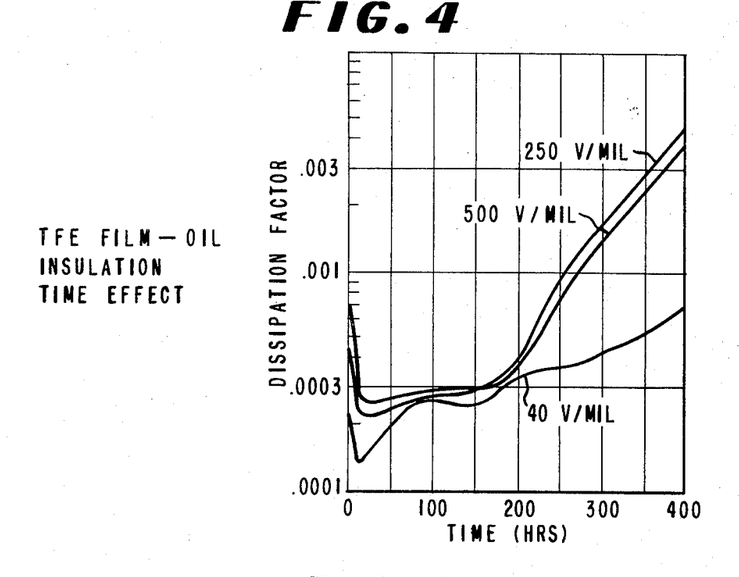
FIG. 4 is a graph showing the variation of dissipation factor vs. time for the TFE/oil insulation system of FIG. 3 aged at 100°C. and 500 volts/mil voltage stress and tested at the voltage stress levels indicated.
Figure 5:
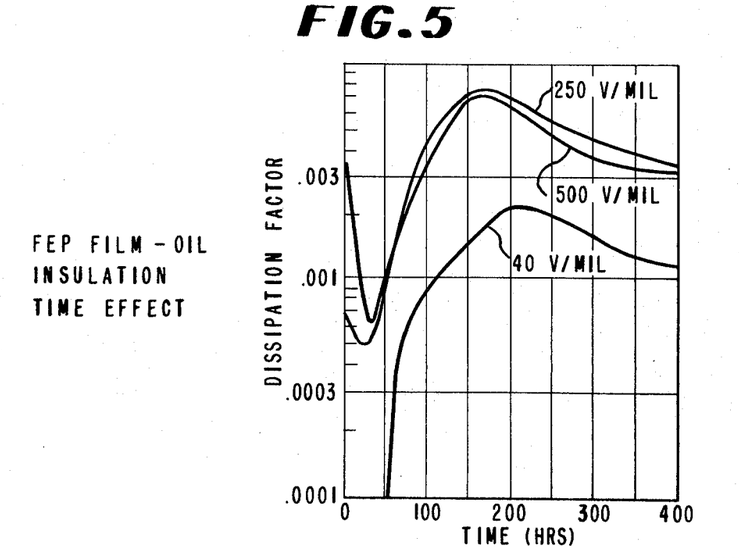
FIG. 5 is a graph showing the variation of dissipation factor vs. time for the FEP/oil insulation system of FIG. 2 aged at 100°C. and 500 volts/mil voltage stress and tested at the voltage stress levels indicated.

FIG. 4 shows the change in dissipation factor over an extended period of time at 100°C. and 500 volts/mil stress for the TFE test sample of FIG. 3. After 400 exposure hours, the dissipation factor increased to 0.004. As shown in FIG. 5 under the same long term exposure conditions, the dissipation factor for the FEP test sample of FIG. 2 also increased greatly to give a dissipation factor of 0.007 after only 150 hours. These results are in close agreement with the results reported in the aforementioned IITRI report based on cable model samples.

The TFE and FEP used in these examples and those that follow had dielectric constants of 2.1 to 2.2. The polybutene oil used in these examples and those that follow had a dielectric constant of 2.2 and a dissipation factor of 0.003.

Figure 6:
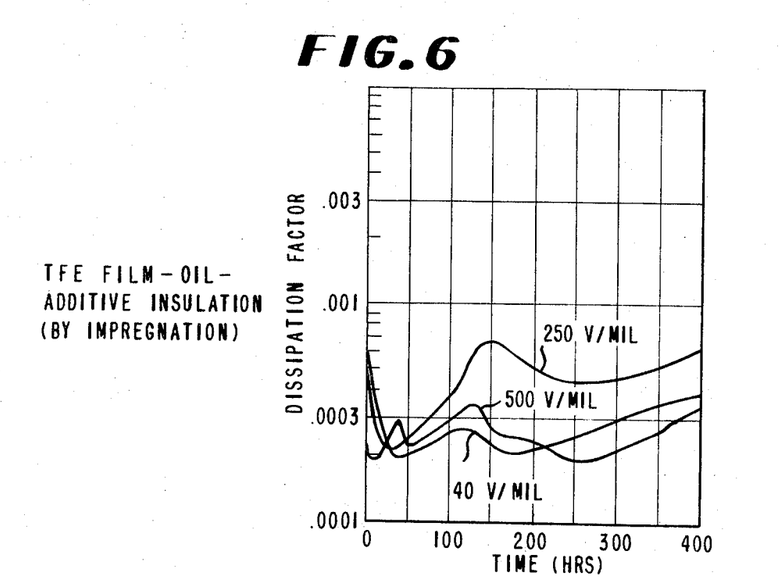
FIG. 6 is a graph showing the effect of adding a small amount of silicone oil to the polybutene oil of the insulation system of FIG. 4.
Figure 6A:
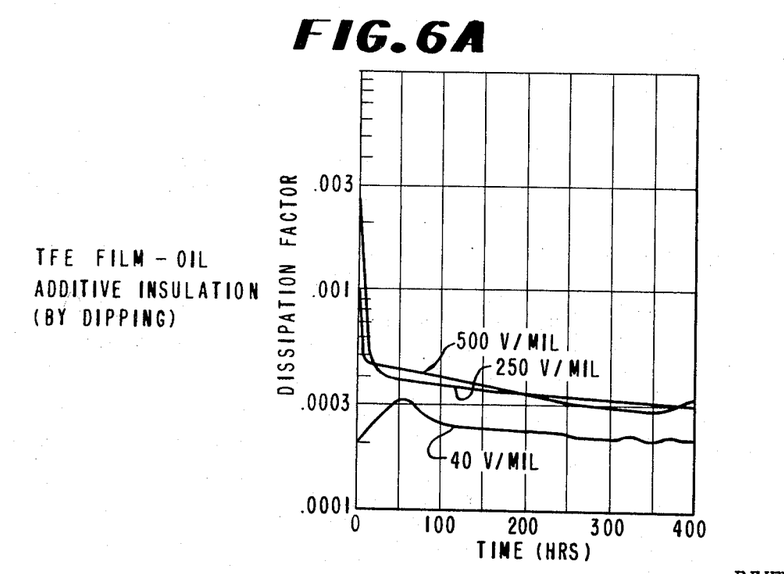
FIG. 6A is a graph showing the effect of adding the silicone oil to the insulation system of FIG. 6 in a different way.

The results of premixing 0.5 percent by weight of poly(dimethylsiloxane) oil(DC–200 – 350 centistokes viscosity) with the polybutene oil of the test sample of FIG. 3 is shown in FIG. 6, wherein the increase in dissipation factor with exposure time at 100°C. was much less. Improvement is also shown in FIG. 6A wherein instead of premixing the poly(dimethylsiloxane) oil with the polybutene oil, the films of the test sample were dipped into the silicone oil and stacked "wet", followed by vacuum flooding of the stack of films with the polybutene oil to form the test sample. Thus, at 500 volts/mil and 250 hours of exposure at 100°C., the dissipation factor of 0.008 in FIG. 3 was decreased to 0.00038 in FIG. 6 and 0.00032 in FIG. 6A. The DC–200 has a dielectric constant of 2.2 and a dissipation factor of 0.007.

Figure 7:
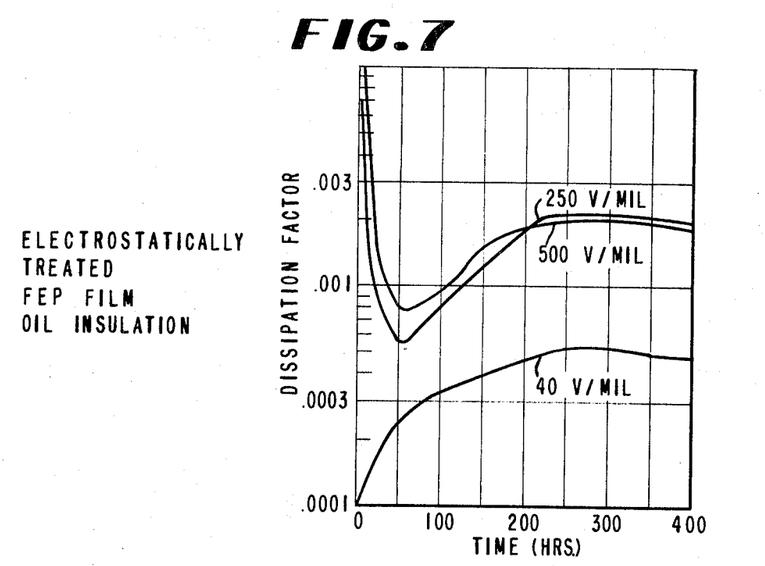
FIG. 7 is a graph showing the effect of subjecting the copolymer of the insulation system of FIG. 5 to electrostatic discharge.

In FIG. 7, the film of the test sample of FIG. 5 was subjected to electrostatic discharge essentially according to the procedure of Example 1 of U. S. Pat. No. 3,296,011 and subjected to long term exposure at 100°C. and 500 volts/mil of stress. Although the dissipation factor increased to some extent, the dissipation factor was still substantially less than when the electrostatic discharge treatment of the films was omitted. This, at a test voltage of 500 volt/mil stress, the dissipation factor at 250 hours exposure of almost 0.005 (FIG. 5) was decreased to slightly less than 0.002.

Figure 8:
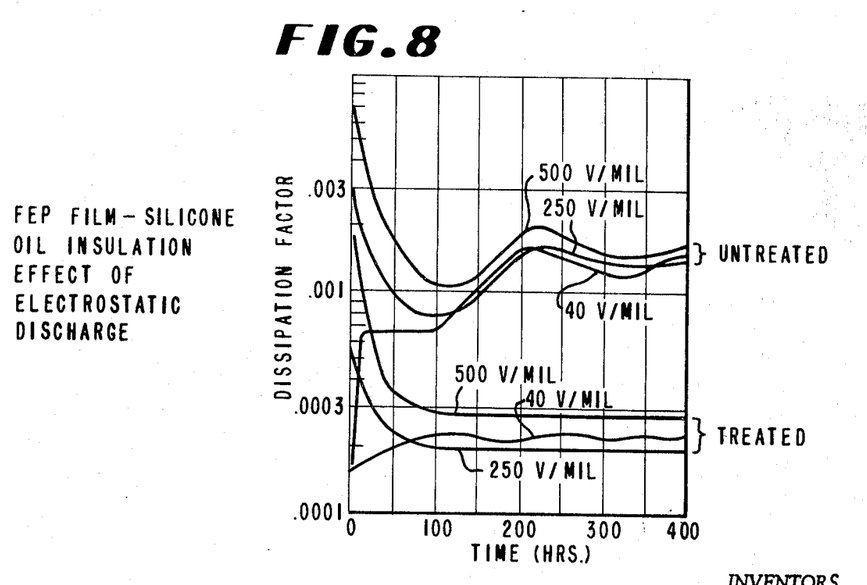
FIG. 8 is a graph showing the variation of dissipation factor vs. time for the insulation system of FIG. 5 but containing silicone oil instead of polybutene oil and the improvement, represented by the lower set of curves, obtained by subjecting the FEP film to electrostatic discharge.

The test sample for which results are reported in FIG. 8 was the same as for FIG. 2 and FIG. 5 except that the dielectric oil was entirely the poly(dimethylsiloxane) used as the additive in the test sample of FIG. 6. This oil was not purified by clay treatment prior to use. The upper set of curves represent the long term exposure results at 100°C. and the lower set of curves represent the results under the same conditions except that the copolymer film was subjected to electrostatic discharge according to the procedure used for the test sample of FIG. 7. After 250 hours at 500 volt/mil stress, the dissipation factor for the latter test sample was about 0.00028 as compared to 0.002 for the test sample containing the untreated film.

Figure 9:
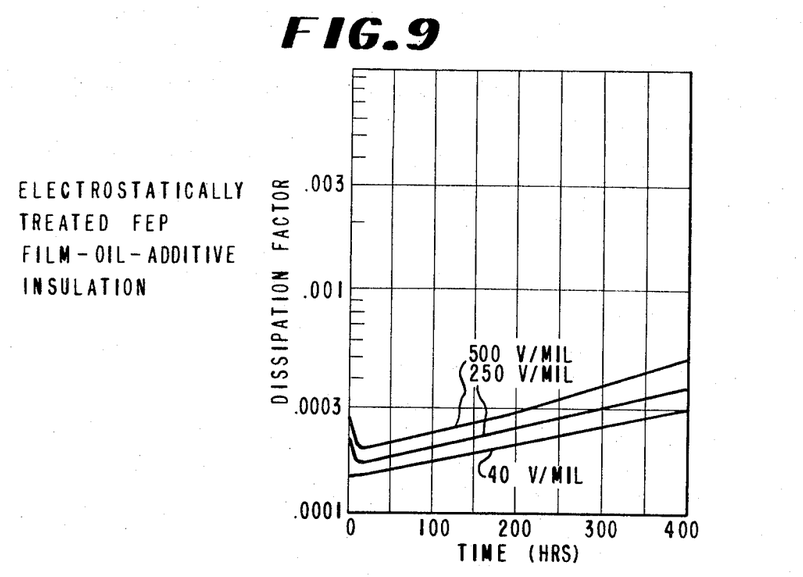
FIG. 9 is a graph showing the effect of subjecting the FEP film to electrostatic discharge and adding a small amount of silicone oil to the polybutene oil of the insulation system of FIG. 5.

The test sample for which the long term exposure results at 100°C. are shown in FIG. 9 involved using the test sample FIG. 2 and premixing 1.0 percent by weight of poly(dimethylsiloxane) (DC–200) with the polybutene oil and subjecting the copolymer films to electrostatic discharge treatment according to the procedure used for the test sample of FIG. 7. The dissipation factor after 250 hours at 500 volts/mil stress of 0.005 (FIG. 5) was decreased to 0.00035 as shown in FIG. 9. The dissipation factor was decreased only to 0.002 when the copolymer film was the only element of the cable modified (by electrostatic discharge) according to the present invention.

Figure 10:
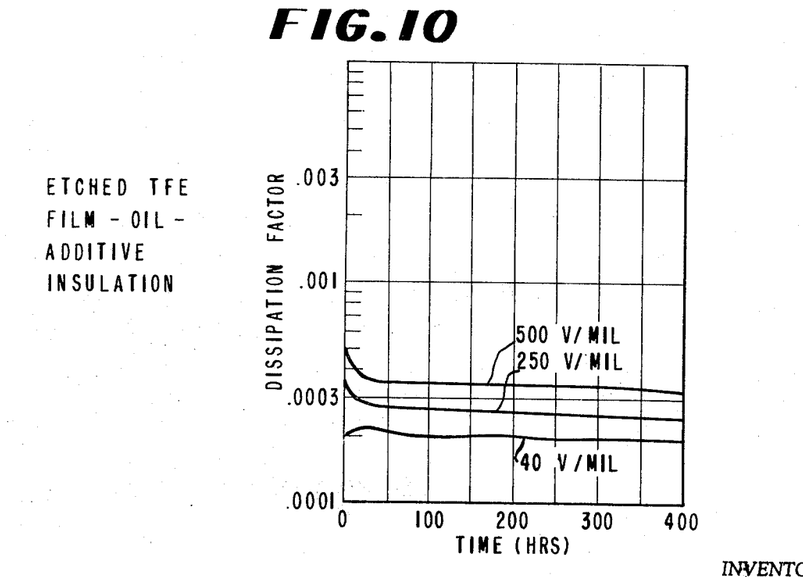
FIG. 10 is a graph showing the effect of etching the surface of the polytetrafluoroethylene tape and adding a small amount of silicone oil to the polybutene oil of the insulation system of FIG. 4.

In FIG. 10 the long term exposure results at 100°C. are shown when the films of the test sample of FIG. 4 were surface activated by dipping the polytetrafluoroethylene film into a 2 percent solution of sodium 1- methyl naphthalene in tetrahydrofuran at room temperature for 5 seconds to etch both surfaces of the film before assembly into the test sample, and 1.0 percent by volume of poly(dimethylsiloxane) was premixed with the polybutene oil. At 500 volts/mil stress and 250 hours, the dissipation factor was only about 0.00035 as compared to 0.0008 shown in FIG. 4.

Figure 11:
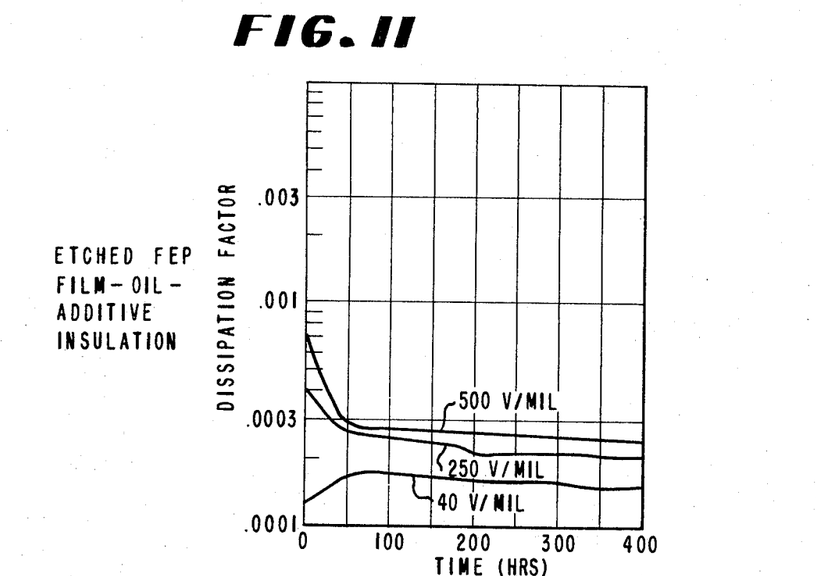
FIG. 11 is a graph showing the effect of etching the surface of the FEP film and adding a small amount of silicone oil to the polybutene oil of the insulation system of FIG. 5.

In FIG. 11, the same modifications as made to the test sample of FIG. 10, were made on the copolymer/oil insulation system (except that the copolymer was subjected to the same sodium etching solution for 1 minute) and similarly low dissipation values persisted over long periods of exposure at 100°C.

A test sample was made of polybutene oil and films of linear polyethylene (dielectric constant 2.3 and dissipation factor of 0.0001 at 20°C.) and this was subjected to thermal aging at 75°C. at voltage stress of 500 volts/mil. The test samples were periodically subjected to test voltages corresponding to voltage stresses of 40, 250, 500 volts/mil across the test sample. The results of this exposure are shown as the upper set of curves in FIG. 12. At 40 volts/mil, the dissipation factor increased from 0.00009 to level off at about 0.0006. At 500 volts/mil voltage stress the dissipation factor diminished with time but the dissipation factor after modification, as will hereinafter be described, was still an improvement. The results at 250 volts/mil were intermediate in terms of approximate level of dissipation factor, but the increase with time in the early stage of the test was still present. The results of repeating this test on the same test sample except that the polyethylene films of the test sample were subjected to electrostatic discharge treatment and 1.0 percent by volume of silicone oil (DC-200) was premixed with the polybutene oil, are shown as the lower set of curves in FIG. 12. For these curves, at a voltage stress of 500 volts/mil, the dissipation factor diminished to a level of 0.000065. At a voltage stress of 40 volts/mil and 250 volts/mil, the dissipation factor in each case diminished rather than increased with time to levels which were substantially lower than obtained for the unmodified test samples.

A test sample was also made of films of polycarbonate (dissipation factor of 0.001 at 20°C. and dielectric constant of 3.2) and was subjected to thermal aging at 100°C. at a voltage stess of 500 volts/mil. Periodically, test voltages corresponding to voltages stresses of 40 volts/mil and 500 volts/mil across the test sample were applied. The oil was polybutene oil. The results of this exposure is shown as the upper 500 volts/mil and 40 volts/mil curves in FIG. 13. Upon subjecting the films of the test sample to electrostatic discharge treatment, the improved results represented by the lower curves of FIG. 13 at voltage stresses of 40 volts/mil and 500 volts/mil were obtained. For the untreated polycarbonate test sample subjected to 500 volts/mil, the dissipation factor increased from 0.001 to level off at about 0.0013 while the dissipation factor of the treated sample diminished from a higher starting value to level off at about 0.0007. The degree of improvement obtained for this example is somewhat less than for the other polymers discussed because the relatively higher dissipation factor of polycarbonate masks some of the increase in dissipation factor exhibited by lower loss polymers.

Figure 12:
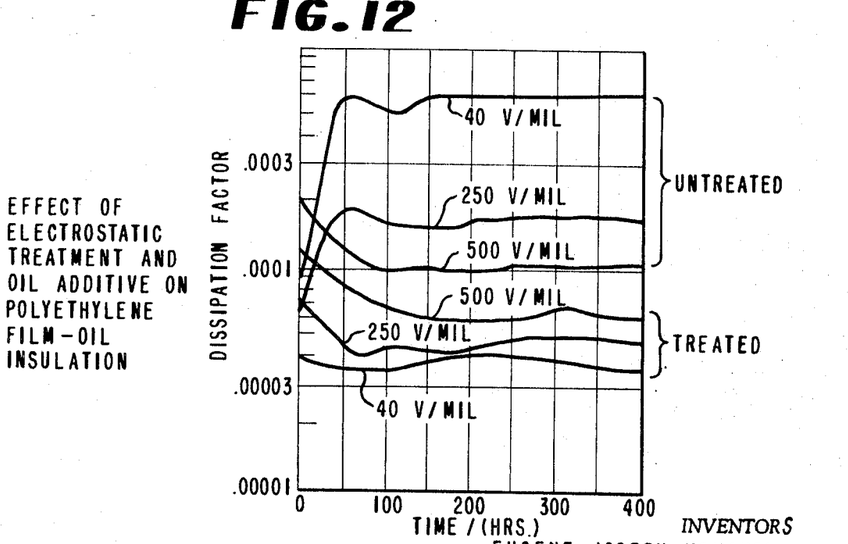
FIG. 12 is a graph showing the variation of dissipation factor vs. time for polyethylene film/oil insulation aged at 75°C. and 500 volts/mil and tested at the voltage stress indicated, and the improvement, represented by the lower set of curves, obtained by subjecting the film to electrostatic discharge and adding silicone oil to the oil of the system.
Figure 13:
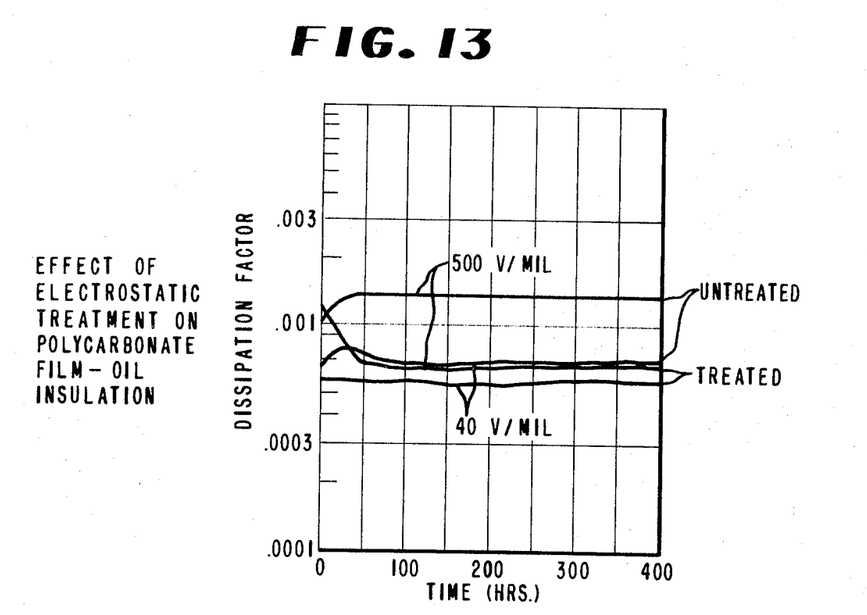
FIG. 13 is a graph showing the variation of dissipation factor vs. time for a polycarbonate film/oil insulation system aged at 100°C. and 500 volts/mil and tested at the voltage stress indicated and the improvement, represented by the lower set of curves, obtained by subjecting the film of the insulation system to electrostatic discharge.

The apparatus and procedure for treating the film described with respect to FIGS. 12 and 13 were as follows:

The apparatus consisted of a base electrode in the form of a horizontal stainless steel drum 4 ⅝ inches in diameter and 10 inches long, rotatable on its axis. Covering the base electrode in close contact was a dielectric layer of FEP of 20 mils thickness. A high voltage electrode 6 inches long was horizontally disposed parallel to the axis of the base electrode so that it presented a ¼ inch wide flat face toward the base electrode. The face of the high voltage electrode was separated from the dielectric covering layer by a gap of 40 mils. A polymer film to be treated was stretched tightly over the dielectric covering layer, and the drum was rotated to move the film past the high voltage electrode at a speed of 11 feet/minute. An A-C power supply providing 6500 volts at a frequency of 10,000 hertz was applied between the above-mentioned electrodes creating a corona between the high voltage electrode and the film. The film was subjected to three passes on each side in an air atmosphere.

From curves in FIGS. 4 and 5, it can be noticed that the dissipation factor at 500 volts/mil stress is intermediate to the values at the lower voltage stresses of 250 volts/mil and 40 volts/mil. Surprisingly, when modifications to both the oil and film (tape) of the insulation system are undertaken, the dissipation factors re-order themselves to increase with increasing voltage stress as shown by the curves in FIGS. 9, 10 and 11. This effect is especially visible for the polyolefin film/synthetic hydrocarbon oil insulation system represented by the upper curves of FIG. 12 and the same system but subjected to dual modification as represented by the lower curves of FIG. 12.

The degree of improvement in lowering and/or stabilizing the dissipation factor of polymer tape/oil insulations obtained by the present invention varies with the degree of increase in affinity effected between polymer tape and oil. For some insulation systems, e.g. fluorocarbon polymer tape/oil, affinity is poor and substantial improvement in affinity is required to get significant improvement in dissipation factor. For other insulation systems, e.g. polyethylene tape/oil, affinity prior to any modification is much better as evidenced by the low dissipation factor values (0.0001 to 0.0006) for the upper curves of FIG. 12 as compared to those for the curves of FIG. 4 (0.00015 to 0.004) and FIG. 5 (0.0001 to 0.007) derived from fluorocarbon polymer tape/oil insulation systems.

Figure 14:
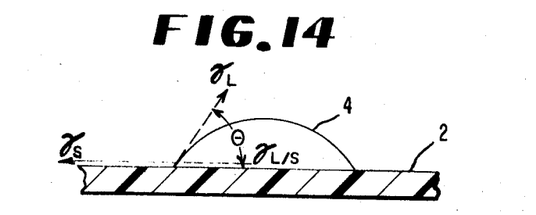
FIG. 14 schematically depicts in side elevation a drop of oil on a film of polymer.

The affinity of oil and polymer for one another can be explained in terms of the forces present at the interface between the oil and polymer. When a drop of oil is placed on the polymer surface, the drop of oil does not spread on the polymer but instead forms a bead which is the result or balance between the force tending to spread the bead and the forces tending to prevent spreading. This is illustrated in FIG. 14 by the drop of oil 4 on a film 2 of polymer. As shown in the drawing, the force tending to spread the bead is the surface energy ($\gamma_s$) of the polymer which can be represented by the vector along the surface of the polymer in the direction away from the bead. The forces tending to contract the bead are the surface tension ($\gamma_L$) of the oil and the interface tension ($\gamma_{L/S}$), which can be represented by a pair of vectors one running from the polymer surface tangent to the bead where it contacts the surface and the other running in the opposite direction from the vector $\gamma_s$, respectively. The angle between vectors $\gamma_L$ and $\gamma_{L/S}$ is called the contact angle ($\theta$). The oil will spread spontaneously when vector $\gamma_s$ exceeds the sum of vectors $\gamma_{L/S} + \gamma_L$. Thus, the affinity of the oil and the polymer for one another can be described by the equation $$S = \gamma_S - (\gamma_{L/S} + \gamma_L) \quad (1)$$

wherein S is the spreading coefficient in ergs/cm.$^2$. According to this equation, the more negative the value of S, the lower is the affinity of the oil and polymer for one another. Conversely, the less negative the value of S, the affinity of the oil and polymer for one another increases. At zero and for positive values of S, spontaneous spreading of the oil over the surface of the polymer occurs in the sense that no contact angle $\theta$ is formed. Thus, when the spreading coefficient is said to have been increased, this means that S has increased in a positivie direction to either a smaller negative number or zero or a plus value, and this means an increase in affinity. A low spreading coefficient means a high negative value for S and poor affinity between the coil and polymer.

For ease of measurement in cases where spontaneous spreading does not occur, equation (1) can be simplified by the trigonometric relationship that $\gamma_S - \gamma_{L/S}$ from the equation is equal to $\gamma_L \cos \theta$, which when substituted in equation (1) gives the equation:

$$S = \gamma_L (\cos \theta - 1) \quad (2)$$

enabling spreading coefficient to be calculated from the measurement of oil surface tension and contact angle using standard equipment and procedures. The following procedures for measuring these parameters were used:

The contact-angle measuring apparatus consisted of an optical bench on which was mounted a telescopic eye-piece fitted with cross-hairs and goniometer, an illuminating light, and a sample platform positioned between the eye piece and illuminating light. A sample of polymer film was fastened horizontally on the sample platform and a drop of the oil being tested was placed on the film. Sighting through the telescope, the drop was brought into focus. The cross-hairs were then adjusted to be tangent to the drop at the point of contact with the solid, and the contact-angle, $\theta$, was read from the goniometer.

Surface tension was determined by the ring method. A platinum ring measuring 5.999 cm. in circumference and having a circumference to diameter ratio of 52.9 was immersed in a beaker of the oil being tested which was placed on the crosshead of an Instron Universal Testing Machine. The ring was attached to a special measuring head that accurately measured the force exerted on the ring. The crosshead was moved, and the force required to detach the ring from the surface was recorded. The surface tension was then calculated from $\gamma = \beta f/4\pi r$, where $\gamma$ is the surface tension, $f$ is the force, $r$ is the radius of the ring, and $\beta$ is a correction factor supplied by the manufacturer of the ring and is dependent on the diameter of the wire used for the ring and the density of the oil. By way of example, a mixture of 1 percent silicone oil (DC-200) in polybutene oil decreased the surface tension of the polybutene oil from 29 ergs/cm.$^2$ to 21.9 ergs./cm.$^2$.

These procedures were followed to determine the spreading coefficient of various polymer oil combinations before and after modification as described hereinafter.

Fluorocarbon polymers as would be expected from their known high degree of inertness have relatively low spreading coefficients relative to oil. For example, polytetrafluoroethylene has a spreading coefficient of −10.1 ergs/cm.$^2$ with respect to polybutene oil. This combination of polymer and oil was subjected to various modifications and the resultant spreading coefficients and dissipation factors are shown in TABLE I.

TABLE I — POLYTETRAFLUOROETHYLENE-POLYBUTENE OIL

| Modification Polymer | Oil | Spreading Coefficient ergs./cm.$^2$ | Dissipation* Factor ($\times 10^4$) |
|---|---|---|---|
| none | none | −10.1(FIG.4) | 41 |
| none | 1% DC-200 | −3.7(FIG.6) | 6.1 |
| Na/naphthalene etch | none | −1.0 | — |
| Na/naphthalene etch | 1% DC-200 | S.S. **(FIG.10) | 3.3 |
| none | 0.5% 1-perfluorododecyldodecane | S.S ** | 3.9 |

*maximum dissipation factor of test sample over 400 hours at 100°C. and 500 volts/mil, hereinafter referred to as maximum dissipation factor.
**spontaneous spreading, value of S was zero or a plus value.

This table shows that either etching of the polymer or adding a small amount of silicone oil to the polybutene oil greatly increases the spreading coefficient and decreases the dissipation factor of this insulation system. The combination of these modifications produced the highest spreading coefficient and lowest dissipation factor. For the improved polytetrafluoroethylene/polybutene coil insulation systems of the present invention, the spreading coefficient should be increased to at least −7.0 by modification of the oil and/or polymer, and preferably to at least −5.0 in order to obtain significant improvement in dissipation factor of this insulation system.

When an oil having different affinity for polytetrafluoroethylene than polybutene oil is used as the oil in the insulation system, different spreading coefficients are obtained. For example, when instead of polybutene oil, silicon oil (DC-200 which has a surface tension of 20.4 ergs/cm.$^2$) was used, the spreading coefficient of the polytetrafluoroethylene/silicone oil combination was −2.2 which increased to a plus value when the polytetrafluoroethylene was subjected to a sodium/naphthalene etch.

For tetrafluoroethylene copolymer, a still further difference in affinity to various oil is obtained. For example, the combination of tetrafluoroethylene-hexafluoropropylene copolymer (about 16 percent hexafluoropropylene by weight) and polybutene was subjected to various modifications to obtain the results shown in TABLE II.

TABLE II — TETRAFLUOROETHYLENE/HEXAFLUOROPROPYLENE COPOLYMER AND POLYBUTENE OIL

| Polymer | Modification Oil | Spreading Coefficient ergs./cm.$^2$ | Maximum Dissipation Factor ($\times 10^4$) |
|---|---|---|---|

| | | | |
|---|---|---|---|
| none | none | −14.2(FIG.5) | 57 |
| none | 1% DC–200 | −7.0 | — |
| Corona/GMA* | none | −1.2(FIG.7) | 20 |
| Corona/GMA* | 1% DC–200 | −0.9 | 12 |
| Na/naphthalene etch | none | −0.3 | — |
| Na/naphthalene etch | 1% DC–200 S.S. (FIG.9) | | 2.5 |
| Na/NH₃ etch | none | −0.7 | — |
| Na/NH₃ etch | 1% DC–200 S.S. | | — |

* glycidyl methacrylate

This table shows that modification of either the oil or the polymer increases the spreading coefficient and decreases the dissipation factor of insulation systems made from the modified combination. Again, when both the oil and the polymer were modified, best results were obtained. For tetrafluoroethylene copolymers, modification of the copolymer and/or the polybutene oil should be carried out to increase the spreading coefficient to be at least −9.0, and preferably at least −7.0 in order to obtain a significant improvement in dissipation factor.

When silicone oil (DC–200) was substituted for polybutene oil, the results shown in Table III were obtained.

TABLE III — TETRAFLUOROETHYLENE-HEXAFLUOROPROPYLENE COPOLYMER AND SILICONE OIL

| Modification to Polymer | Spreading Coefficient ergs/cm.$^2$ | Maximum Dissipation factor (× 10$^4$) |
|---|---|---|
| none | −4.8 | 22 |
| Corona/glycidyl methacrylate | −0.2 | 2.8 |
| Na/naphthalene etch | S.S. | — |
| Na/NH₃ etch | S.S. | — |

Even though the spreading coefficient of this insulation system unmodified is fairly high, modifications of the copolymer surface to increase its surface energy produces a surface which has still greater affinity for the oil.

For the fluorocarbon polymers, as illustrated in Tables I and II, modification of the polymer surface has a greater effect on spreading coefficient and dissipation factor than modification of the oil because of the low degree of surface activity of the fluorocarbon polymer. For polymers of higher surface activity and thus increased affinity for oil, the relative improvement of polymer modification over oil modification is less pronounced.

The combination of polycarbonate and polybutene oil was subjected to various modifications and the effect on spreading coefficient and dissipation factor are shown in Table IV.

TABLE IV — POLYCARBONATE AND POLYBUTENE OIL

| Modification | | Spreading Coefficient ergs./cm.$^2$ | Maximum Dissipation factor (× 10$^4$) |
|---|---|---|---|
| Polymer | Oil | | |
| none | none | −0.6(FIG.13) | 12.5 |
| none | 1% DC–200 | S.S. | 8.0 |
| Corona/air | none | −0.3(FIG.13) | 6.5 |

The combination of high density polyethylene and polybutene oil was subjected to various modifications and the effect on spreading coefficient and dissipation factor are shown in Table V.

TABLE V — POLYETHYLENE AND POLYBUTENE OIL

| Modification | | Spreading Coefficient ergs./cm.$^2$ | Maximum Dissipation factor (× 10$^4$)[1] |
|---|---|---|---|
| Polymer | Oil | | |
| none | none | −0.8(FIG.12) | 6.0 |
| Corona/air | 1% DC–200 | S.S.(FIG.12) | 0.8 |

1. 400 hour exposure test run at 80°C.

The combination of polypropylene and polybutene oil exhibited a spreading coefficient of −0.4. When 1 percent DC-200 silicone oil by volume was added to the polybutene oil, spontaneous spreading over the polypropylene surface occurred.

The combination of poly(2,6-dimethylphenylene oxide)/polybutene oil exhibited a spreading coefficient of −0.4. Spontaneous spreading occurred when 1 percent of DC-200 silicone oil by volume was added to the polybutene oil.

The combination of polyethylene terephthalate and polybutene oil was subjected to various modifications and the effect on spreading coefficient and dissipation factor are shown in Table VI.

TABLE VI — POLYETHYLENE TEREPHTHALATE AND POLYBUTENE OIL

| Modification | | Spreading Coefficient ergs./cm.$^2$ | Maximum Dissipation factor (× 10$^4$) |
|---|---|---|---|
| Polymer | Oil | | |
| none | none | −1.1 | 79 |
| Corona/air | 1% DC–200 | S.S. | 65 |

This combination exhibits only a small improvement in dissipation factor after modification since the dielectric loss of polyethylene terephthalate (dielectric constant of 3.2 and dissipation factor of 0.002) is so high that the rise in dissipation factor with time of exposure to high voltage stress at 100°C is masked. This polymer would be more suitable for capacitor application.

In general with respect to all polymers which can be used to form the tape component of improved insulation systems of the present invention, the affinity of the oil and polymer for one another is preferably such that the spreading coefficient for the combination of modified oil and/or polymer is at least −0.3 ergs/cm.$^2$, and more preferably a state of spontaneous spreading between these components exists. A a minimum in order to realize significant benefit, the modification to the oil and/or tape should be carried out to the extent of increasing the affinity of the oil and polymer tape for one another by at least 20 percent as calculated from the expression

[ S (initial) − S (after modification)/S(initial) ] × 100.

As many apparently widely different embodiments of this invention may be made without departing from the spirit and scope thereof, it is to be understood that this invention is not limited to the specific embodiments thereof except as defined in the appended claims.

We claim:

1. An electrical insulation system comprising a plurality of layers of polymer tape and oil flooding said layers, said polymer tape having a surface energy which is greater than the natural surface energy of said tape corresponding to an increase in spreading coefficient, S, of at least 20 percent as determined by the equation $S = \gamma_L (\cos\theta - 1)$ wherein $\gamma_L$ is the surface tension of said oil and $\theta$ is the contact angle between said oil and said tape.

2. The insulation system of claim 1 disposed between current-carrying conductors of electrical cable.

3. The insulation system of claim 2 wherein said cable is capable of operating at a voltage of at least 130 kv.

4. The insulation system of claim 1 wherein the increase in surface energy is obtained by the surface of said tape being chemically etched.

5. The insulation system of claim 1 wherein the increase in surface energy is obtained by the surface of said tape having been exposed to electrostatic discharge treatment.

6. The insulation system of claim 1 wherein said polymer tape is made of polyolefin.

7. The insulation system of claim 6 wherein said polyolefin is polyethylene.

8. The insulation system of claim 6 wherein said polyolefin is polypropylene.

9. The insulation system of claim 1 wherein said oil contains a surface tension lowering agent.

10. The electrical insulation system of claim 1 wherein said oil is silicone oil.

11. An electrical insulation system comprising a plurality of layers of fluorocarbon polymer tape and oil flooding said layers, the oil and polymer tape having an increased affinity for one another as compared to the natural affinity of said oil and polymer tape for one another, said increased affinity being characterized by increased adhesive forces between the polymer tape and the oil relative to the cohesive forces in the oil.

12. The insulation system of claim 11 wherein said oil is synthetic hydrocarbon oil and said polymer is polytetrafluoroethylene and said oil and said polymer exhibit a spreading coefficient of at least $-7.0$ ergs./cm$^2$.

13. The insulation system of claim 11 wherein said oil is polybutene oil.

14. The insulation system of claim 11 wherein said oil is synthetic hydrocarbon oil and said polymer is tetrafluoroethylene copolymer and said oil and said polymer exhibit a spreading coefficient of at least $-9.0$ ergs./cm$^2$.

15. The insulation system of claim 11 wherein said fluorocarbon polymer is polytetrafluoroethylene.

16. The insulation system of claim 11 wherein said fluorocarbon polymer is tetrafluoroethylene copolymer.

17. The insulation system of claim 11 wherein the increase in affinity is at least 20 percent.

18. The insulation system of claim 11 wherein said increased affinity is characterized by said polymer tape having a surface energy which is greater than the natural surface energy of said tape.

19. The insulation system of claim 11 wherein said oil contains a surface tension lowering agent.

20. The insulation system of claim 11 wherein said increased affinity is characterized both by said polymer tape having a surface energy which is greater than the natural surface energy of said tape and said oil containing a surface tension lowering agent.

21. An electrical insulation system comprising a plurality of layers of polymer tape and an oil selected from the group consisting of paraffinic oil or synthetic hydrocarbon oil flooding said layers, said oil containing silicone oil as a surface tension lowering agent.

22. The insulation system of claim 21 wherein said agent comprises from 0.01 to 10 vol. % of said oil.

23. The insulation system of claim 21 wherein said agent comprises 0.1 to 2 vol. % of said oil.

24. The insulation system of claim 21 wherein said oil is polybutene oil.

25. The electrical insulation system of claim 21 wherein said polymer tape is surface activated.

26. An electrical insulation system comprising a plurality of layers of fluorocarbon polymer tape and oil flooding said layers, said oil being inert to the polymer tape, the oil and the polymer tape having an increased affinity for one another as compared to the natural affinity of said oil and said polymer tape for one another, the increased and natural affinity being defined by the equation $S = \gamma_L (\cos \theta - 1)$ wherein S is the spreading coefficient, $\gamma_L$ is the surface tension of the oil and $\theta$ is the contact angle between the oil and the polymer tape, the increased affinity being characterized by an increase in spreading coefficient of at least 20 percent.

* * * * *